CROSS CORRELATING SYSTEM FOR PCM COMMUNICATIONS
Filed Nov. 8, 1966
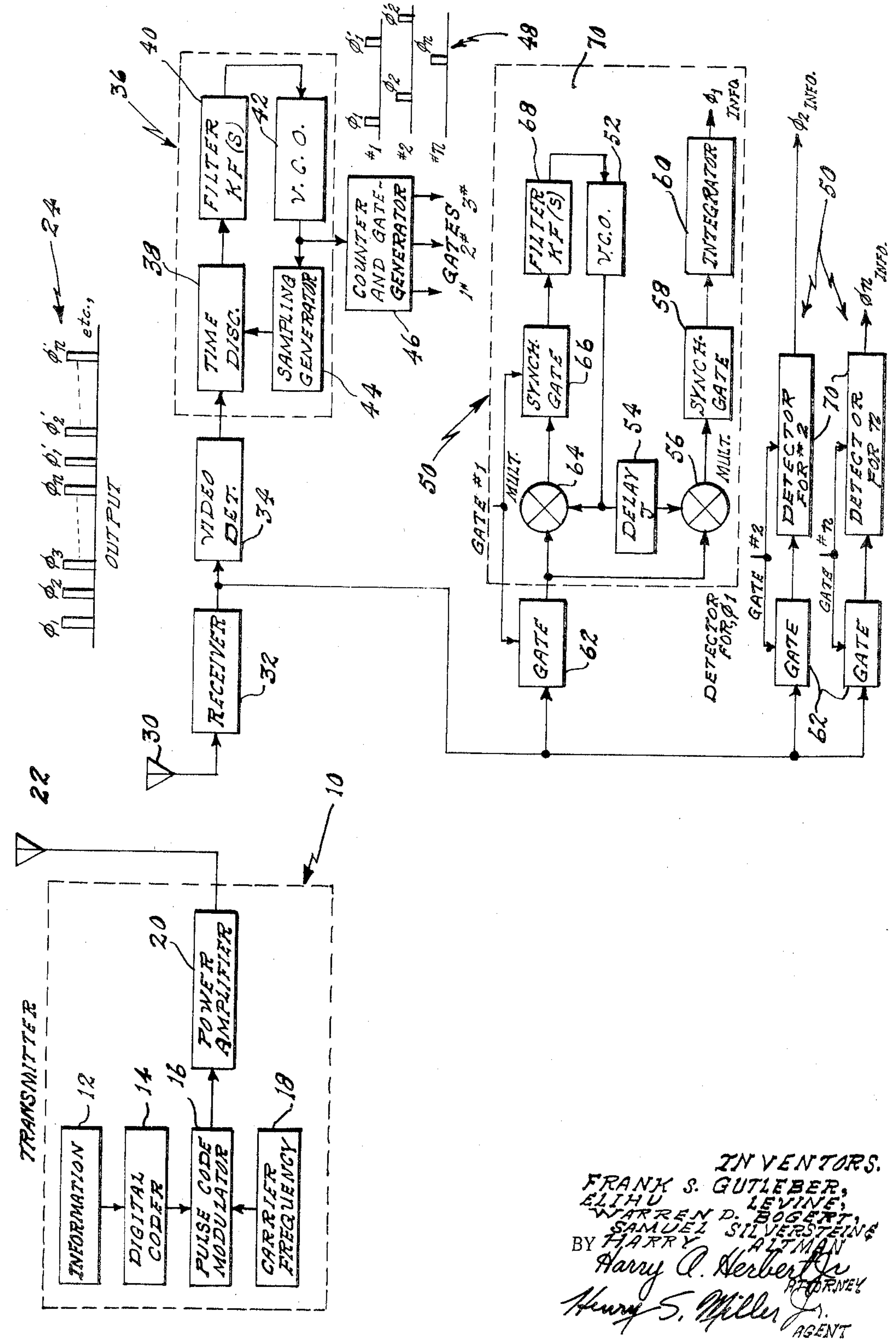
INVENTORS.
FRANK S. GUTLEBER,
ELIHU LEVINE,
WARREN D. BOGERT,
SAMUEL SILVERSTEIN&
HARRY ALTMAN
BY Harry A. Herbert Jr
ATTORNEY
Henry S. Miller Jr.
AGENT United States Patent Office
3,483,549
Patented Dec. 9, 1969

3,483,549

CROSS CORRELATING SYSTEM FOR PCM COMMUNICATIONS

Frank S. Gutleber, Wayne, N.J., Elihu Levine, Monsey, N.Y., Warren D. Bogert, Fort Lee, N.J., Samuel Silverstein, Monsey, N.Y., and Harry Altman, Cedar Grove, N.J., assignors to the United States of America as represented by the Secretary of the Air Force Filed Nov. 8, 1966, Ser. No. 593,243
Int. Cl. H04l 3/00; G06g 7/19
U.S. Cl. 340—347 5 Claims This invention relates generally to correlation techniques, and more specifically to a system for the transformation of series digital code information into parallel digital code information to enable the full utilization of correlation techniques.

In the past, when information pulses were sampled, they wede handled either in a series system or a parallel system. The series system has the advantage of utilizing a very narrow bandwidth which facilitates the detection of very small signal-to-noise ratios with the attendant disadvantage of being a relatively time-consuming operation. The parallel code information system provides for rapid correlation of data. However, it requires a wide bandwidth and hampers the detection of small signal-to-noise ratios.

With our new system, it is now possible to combine the advantages of the series and parallel systems, while substantially eliminating the disadvantages of the two.

In the fundamental mode of operation of our system, some coded PCM (pulse code modulated) signal is transmitted at F bits per second where $m$ number of binary digits can exist in each code group. This results in each carrier loop sampling frequency being $F/m$ pulses per second and therefore the realizable signal-to-noise (S/N) improvement for each carrier loop is reduced by the number of loops used. However, the information capacity can be linearly exchanged for the final closed loop bandwidth, while still operating at the same signal-to-noise threshold.

It is therefore an object of this invention to provide a novel cross correlating system for pulse code modulation communications.

It is a further object of this invention to provide a new and novel system for transforming series digital code information into parallel digital code information.

It is another object of this invention to provide a novel cross correlating system which operates over a narrow bandwidth with greater speed than hitherto known.

It is still a further object of this invention to provide a novel cross correlating system which detects very poor signal-to-noise ratio with little sacrifice in the information handling capacity of the system.

These and other advantages, features and objects of the invention will become more apparent from the following description taken in connection with the illustrative embodiment in the accompanying drawing wherein the figure is a block diagram of the system embodied by this invention.

Referring now to the drawing, a PCM signal generator is shown generally at 10. Information in the generator is fed into the digital coder 14 and then passes to the pulse code modulator 16 where it is combined with the carrier frequency 18. The resultant signal is then amplified by the power amplifier 20 and transmitted through the antenna 22 in a conventional form. The output signal is in a series form as shown graphically at 24.

The transmitted signal is detected by the antenna 30 and fed into the receiver 32. Upon receiving the input coded signal, it is video detected by the detector 34 and operated on to establish a fixed well-referenced synchronizing signal to be sampled by pulses synchronized to the voltage control oscillator of the pulse repetition frequency loop 36. The *prf* loop consists of a time discriminator 38, a filter 40, a voltage control oscillator 42 and a sampling generator 44. The *prf* loop synchronizes to the composite bit/second train and therefore the improvement in signal-to-noise operation that this loop reflects would in general be greater than for the individual carrier loops. Both the *prf* and the carrier loops reflect a signal-to-noise improvement given by:

$$S/N \text{ improvement} = K_o \sqrt{\frac{prf_o}{fnn}}$$

where:

$prf_o$=operating *prf* frequency
$fnn$=total effective noise bandwidth for the loop The output of the *prf* loop is then fed to a combination counter and gate generator 46 for operation of the carrier loops. There are $n$ gate outputs and $n$ loops for an $n$ pulse code input. Each carrier loop, due to the gating pulses, would then receive the same code pulse $\phi_1$, $\phi_2$ . . . or $\phi_n$ shown at 48 and the digital information would be obtained by turning the group code "on" or "off" for several pulses. The more pulses integrated over, the better the S/N threshold. The required timing of the "on" and "off" group signals would be determined by the closed loop bandwidth defining parameter $1/\omega_n$, the effective closed loop time constant.

The response of the loop to a step change in code reaches a peak value in a time equal to two loop time constants (i.e. $t=2/\omega_n$). Therefore, the switching rate could not exceed this value. The composite output of the $n$ loops, shown at 50 in the drawing, then provides the transformed parallel digital information whose capacity would be given by the quantity of the loops $n$ divided by the required time necessary $2/\omega_n$ before the information could be changed to the next parallel digital group, i.e.

$$\text{Bits/second} = I_o = \frac{\eta \times \omega_n}{2}$$

The actual "on" or "off" indication from the carrier loops is achieved by first phase shifting the voltage control oscillator 52 by the appropriate $\tau$ (54) where a $\tau$ of 90° would result in a maximum output from the correlation detector, and multiplying this with the original signal (56), stretching or storing the pulsed information in the synchronous gate 58 and filtering the resultant with an integrator circuit 60. The output would have two states depending on whether the signal containing the particular code $\phi_n$ was present or absent and could be detected for very low S/N levels.

It should be noted, however, that prior to the phase shift of the voltage control oscillator the signal output of the VCO must correspond to the input signal. This is done by means of a phase lock loop, in which the gate 46 triggers the gate 62 and synchronous gate 66, the original signal enters, and while part of it is multiplied by the multiplier 56, part of it is also multiplied by the multiplier 64. The multiplier beats the signal input and the VCO output together giving a low frequency output. The loop filter 68 accepts only this low frequency which is applied as a control voltage to the voltage controlled oscillator thereby forcing the VCO output phase to be equal to the signal phase.

Each carrier loop 50 has a gate 62 and a detector 70 which functions in the same manner as the loop described.

The sketches following depict the form of the input and output signal for a simplified idealized case:

Input $1^0 2^0 3^0 4^0 5^0 1^1 2^1 3^1 4^1 5^1 1^2 2^2 3^2 4^2 5^2 1^3 2^3 3^3 4^3 5^3 1^4 2^4 3^4 4^4 5^4 1^5 2^5 3^5 4^5 5^5$ x o x o o x o x o o x o x o o o x x x o o x x x o o x x x o where: x denotes the pulse presence.
o denotes the pulse absence.

Output (Over 3 groups in a time $= \frac{2}{\omega_n}$ )

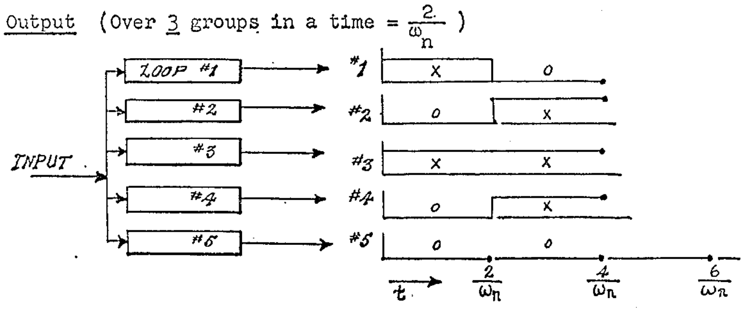

The information capacity in this simplified example is 5 bits in $2/\omega_n$ sec. and the information is integrated over 3 group code pulses.

It must be mentioned here that although theoretically the proposed system could retain the information capacity of an equivalent standard system that did not utilize changing the form of the code to facilitate utilizing phase lock circuitry in conjunction with cross correlation concepts, there is a practical limitation due to the fact that sampling is used in conjunction with the correlation concepts. A reasonable number of group code pulses must be contained in each time period $1/\omega_n$ (say at least 5 pulses) to satisfy the predictable performance for the loops and fully utilize the advantages of correlation.

Therefore $$\omega_n = \frac{1}{5} \times \frac{F}{n}$$

or $$n \times \omega_n = \frac{F}{5}$$

However, to retain the initial information capacity $$I_o = \frac{n \times \omega_n = F}{2}$$

or $$n \times \omega_n = 2F$$

Therefore $n \times \omega_n$ for the practical system could be low by a factor of 10 or the information capacity would be reduced by 10. Simultaneously, however, the result would be an even exchange of capacity for bandwidth and the final operating system would have a better $(S/N)$ threshold. This improvement would be $\sqrt{10}$ or 10 db.

The final absolute threshold for the system utilizing a maximum information capacity would be:

$$(S/N)_t = 3 + (-10) = -13 \text{ db}$$

Although the system as shown in the block diagram has carrier phase lock loop as part of the indicators, the system could function without them if a very stable oscillator source was used in place of each loop. It is believed, however, that this would place in a stringent practical requirement on the system and the phase of the reference in addition to the frequency would have to remain in step with the input.

Although the invention has been described with reference to a particular embodiment, it will be understood to those skilled in the art that the invention is capable of a variety of alternative embodiments within the spirit and scope of the appended claims.

We claim:

1. A system for transforming series digital code information into parallel code information comprising: receiver means for receiving an input signal; a first detector means for detecting coded information; means for synchronizing the detected information with the input signal; and means for switching a plurality of second information detecting and output means, on and off in accordance with said synchronizing means whereby the coded output information is in parallel form.

2. A system in accordance with claim 1 wherein: the first detector means is a video detector.

3. A system in accordance with claim 2 wherein: said means for synchronizing is a pulse repetition frequency loop comprising: a time discriminator, filter, voltage control oscillator and sampling generator.

4. A system according to claim 3 wherein: the means for switching the plurality of second information detecting means comprises a counter and gate generator.

5. A system according to claim 4 wherein: the plurality of second information detecting means comprises; a gate for switching the information detecting means on and off; and carrier loop means.

No references cited.

RODNEY D. BENNETT, Jr., Primary Examiner
DANIEL C. KAUFMAN, Assistant Examiner

U.S. Cl. X.R.

235—181; 325—323